United States Patent [19]
Löhn

[11] Patent Number: 4,598,349
[45] Date of Patent: Jul. 1, 1986

[54] ELECTRONIC TRANSFORMER COMPOSED OF FLYBACK CONVERTERS

[75] Inventor: Klaus B. Löhn, Simmerath, Fed. Rep. of Germany

[73] Assignee: U.S. Philips Corporation, New York, N.Y.

[21] Appl. No.: 646,711

[22] Filed: Sep. 4, 1984

[30] Foreign Application Priority Data

Sep. 17, 1983 [DE] Fed. Rep. of Germany ....... 3333656

[51] Int. Cl.⁴ .......................................... H02M 5/458
[52] U.S. Cl. ...................................... 363/8; 323/222; 363/163
[58] Field of Search ..................... 323/222; 363/8, 16, 363/163

[56] References Cited

U.S. PATENT DOCUMENTS

| | | | |
|---|---|---|---|
| 1,973,055 | 9/1934 | Fitzgerald | 363/8 |
| 4,408,268 | 10/1983 | Peters et al. | 363/163 |
| 4,504,896 | 3/1985 | Easter et al. | 323/222 |

FOREIGN PATENT DOCUMENTS

2901457 7/1980 Fed. Rep. of Germany ...... 363/163
242982 5/1969 U.S.S.R. ............................. 323/222

OTHER PUBLICATIONS

Peltz, "Single Coil 9 Voltage Converter", New Electronics, vol. 15, No. 6, p. 26 (Mar. 23, 1982).

Primary Examiner—William H. Beha, Jr.
Attorney, Agent, or Firm—Robert T. Mayer; Bernard Franzblau

[57] ABSTRACT

An electronic transformer comprising first and second switching converters for converting the positive and negative half periods, respectively, of an input alternating voltage into high frequency voltages, which are rectified to produce an output alternating voltage at the input voltage frequency. The converters are constructed as fly-back converters with the choke coils as well as the output and input capacitors combined into elements common to the two respective high frequency fly-back converters. First and second backward diodes are connected parallel to each switching transistors of the two fly-back converters and each converter includes an auxiliary switching transistor switching at the input frequency to change over the converters from one half period to the other of the input AC voltage.

12 Claims, 8 Drawing Figures

ELECTRONIC TRANSFORMER COMPOSED OF FLYBACK CONVERTERS

This invention relates to an electronic transformer comprising respective switching converters for converting the positive and negative half periods, respectively, of an input alternating voltage into high-frequency voltages and for subsequently rectifying same to obtain an output alternating voltage having a frequency corresponding to that of the input alternating voltage. With respect to the otherwise usual mains transformers, savings in material and weight and possibilities for voltage and power control are obtained in such electronic transformers.

An electronic transformer of this kind is known from U.S. Pat. No. 1,973,055. It is provided with pushpull power amplifiers and has two mutually separated switching circuits for the positive and negative half periods, respectively, of the input alternating voltage. Apart from the fact that the known alternating voltage converter or electronic transformer consists of electron tubes, it is still voluminous and expensive merely due to its essential construction. If such an alternating voltage converter were to be used for operating small motors or gas-discharge lamps, it would be desirable to keep it so small that it can be practically incorporated into the motors or lamps.

Therefore, an object of the invention is to provide an alternating voltage converter having a minimum number of passive separate elements, such as coils, capacitors etc. These passive elements even now still require a comparatively large amount of space, while the active elements, such as transistors, diodes etc., can be combined in integragted circuits.

According to the invention, in an electronic transformer of the kind mentioned in the opening paragraph, the aforesaid object is achieved in that the switching converters are fly-back converters each comprising a high-frequency controlled switching transistor, a choke coil, a fly-wheel diode, an output capacitor and, as the case may be, an input capacitor. The choke coils as well as the output and input capacitors are combined to form respective elements common to the two fly-back converters. A backward diode is connected parallel to each switching transistor and each fly-back converter is associated with an auxiliary transistor switching at the input frequency, which shunts the switching transistor and the fly-wheel diode of the other fly-back converter in its respective inactive state. The inactive state of a fly-back converter is to be understood to mean the state in which the converter is not charged during the half period of the input alternating voltage to be converted by it.

By the use of fly-back converters, the input alternating voltage can be both stepped up and stepped down, that is to say that output voltages above and below the input voltage can be produced. Thus, without auxiliary means, for example, ignition and re-ignition voltages for discharge lamps are obtained. Each of the two fly-back converters operates in respective half period of the input alternating voltage, the two auxiliary transistors causing the converters to change over from one half period to the other. The passive separate elements of the two converters are combined each time into common elements, as a result of which the cost and volume of the circuit are kept low.

According to a preferred further embodiment of the electronic transformer in accordance with the invention, the auxiliary transistors are connected by their respective bases to a more particularly pulsatory alternating voltage source having a frequency corresponding to that of the input alternating voltage and are connected by their emitters to the emitter of the respective switching transistor of a fly-back converter, which emitter is in connection with a terminal of the input alternating voltage source. This has the advantage that the emitters of the auxiliary transistors are connected to the input alternating voltage and so are not charged with a high frequency, as a result of which their control is simplified.

A further improvement and simplification of such an electronic transformer can be attained in accordance with the invention when the auxiliary transistors are connected by their respective bases to a terminal of the input alternating voltage source, while the emitter-base path of each auxiliary transistor is shunted by an auxiliary diode polarized in a sense opposite to that of the base diode of the relevant auxiliary transistor. Thus, an additional control source for the auxiliary transistors is not required.

For the switching transistors, high-voltage field effect transistors are preferred because the backward diode connected parallel to the switching transistors is already contained in these transistors.

The auxiliary transistors are preferably high-voltage bipolar transistors.

Embodiments of electronic transformers according to the invention will now be described more fully with reference to the accompanying drawing, in which.

Figure 1A:
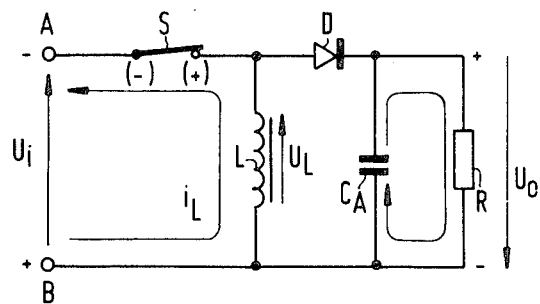
FIGS. 1a and 1b show the principle circuit diagramof a fly-back converter.
Figure 1B:
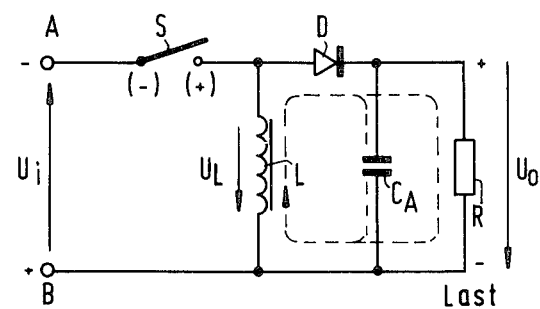

In the converter shown in FIG. 1, a choke coil L is connected through a switch S to the terminals A and B of a direct voltage source. The choke coil L is arranged in parallel with an output capacitor $C_A$, which serves as a storage capacitor and which is connected to the choke coil L through a fly-wheel diode D. The output capacitor $C_A$ is followed by a load R. FIG. 1a shows the flyback converter in the conductive phase and FIG. 1b in the cut-off phase.

This principle of a fly-back converter corresponds to the description in the book by Wüstehube "Schaltnetzteile", Expert-Verlag 1979, but is for a better understanding of the following description modified for a negative input voltage. The switch S is switched on and off at a high frequency $f = 1/T$ (usually 20 to 200 kHz), the ratio between switching-on time and the period T being designated as the duty cycle $V_T$. During the switching-on time $V_T \cdot T$, the constant direct voltage $U_i$ is applied to the choke coil L and the coil current $i_L$ increases linearly with time, the choke coil L storing up magnetic energy (conductive phase, FIG. 1a). The diode D is cut off in this phase.

In the subsequent switching-off time (cut-off phase, FIG. 1b), switch S is opened and the coil passes the energy stored by it via the diode D to the storage capacitor $C_A$ and to the load R. During the conductive phase, the load R is fed from the storage capacitor $C_A$, as indicated in FIG. 1a. In accordance with the function of the circuit, a positive output voltage is formed on the storage capacitor $C_A$ from the negative input voltage.

According to the theory of the switching mains parts, two essentially different operation modes exist. In the first case, in the stationary condition the average coil current is so large that at the beginning of the conductive phase and at the end of the cutoff phase a fundamental current different from zero remains and consequently the choke coil L is never fully discharged (Wüstehube, p. 91, FIG. 3.3). This continuous or trapezoidal mode produces a fixed ratio between the output and input voltage, which is adjustable by the duty cycle $V_T$:

$$U_o = (V_T/1 - V_T)U_i$$

so that a direct voltage transformer is obtained whose transmission ratio can be adjusted by $V_T$.

The second mode of operation is the discontinuous or triangular mode. In this case, the choke coil L is fully discharged in each period of the switching frequency. The increase in current takes place from the current zero (Wüstehube, p. 90, FIG. 3.2b). In this mode of operation, no fixed voltage ratio is adjusted, but the circuit takes up a fixed current proportional to the input voltage at a fixed operating frequency and a fixed duty cycle and thus passes a fixed consumed power P on to the load R. Voltage and current at the load R are then determined by the impedance of the latter in accordance with the known relations:

$$U^2_o = P \cdot R \text{ and } I^2_o = P/R.$$

The voltages $U_i$ and $U_o$ need not necessarily be (constant) direct voltages. The processes and relations described thus far are maintained for any instant when $U_i$ varies only slowly as compared with the switching times T so that during the period of a switching phase (5 to 50 μs) $U_i$ can be considered to be constant. With variations of $U_i$ at the usual mains frequency (50/60 Hz), this condition is fully satisfied. When (negative) sinusoidal half periods of the mains frequency are applied, (positive) sinusoidal half periods of the same frequency are also obtained at the output. In order to guarantee this mode of operation, the time constant R.C must not be too large. This output combination should be on the one hand so slow that for the switching period T there can be developed a constant output voltage $U_o$, but should on the other hand not be too slow in order that the output voltage can follow the mains sinusoidal voltage. Both conditions can be satisfied in practice only with a certain error, which can be kept small when the mains frequency and the switching frequency are sufficiently remote from each other.

In order to obtain a real a.c. operation instead of only unilaterally directed half periods, in FIG. 1 the diode D would have to be repolarized and when the switch S, as is common practice, is constructed as a (unipolar) semiconductor switch, as in FIG. 1 is indicated by (+) and (−), the poles of the switch were also to be interchanged. According to the prior art, comparatively inexpensive solutions can be obtained only with npn trasistors, n-channel FET's or other elements for positive operating voltage. In this case, however, the negative pole (emitter, source) would be connected to the choke coil and would also be subjected to the large voltage fluctuations from $U_i$ to $U_o$ of this coil end, which would make it more difficult to drive the switch. Another possibility to obtain operation with inverse polarisation, according to the invention, consists in that a switch and a diode connected in the same sense are inserted into the opposite lead. FIG. 2 shows such an arrangement. The electronic transformer shown in FIG. 2 has a choke coil L, which is connected through two switches S1 and S2 to the terminals C and D of an input alternating voltage source. In parallel with the choke coil L there is arranged the output capacitor $C_A$, which is connected to the choke coil L through two fly-wheel diodes D1 and D2. The capacitor $C_A$ is followed by the load R. The switch S1 and the fly-wheel diode D1 connected in series with it are shunted by a switch S3, while the switch S2 and the fly-wheel diode D2 connected in series with it are shunted by a switch S4. The switch S1, the fly-wheel diode D1, the choke coil L and the output capacitor $C_A$ on the one hand and the switch S2, the fly-wheel diode D2, the choke coil L and the output capacitor $C_A$ on the other hand each constitute a switching regulator having a common choke coil L and a common output capacitor $C_A$.

Figure 2A:
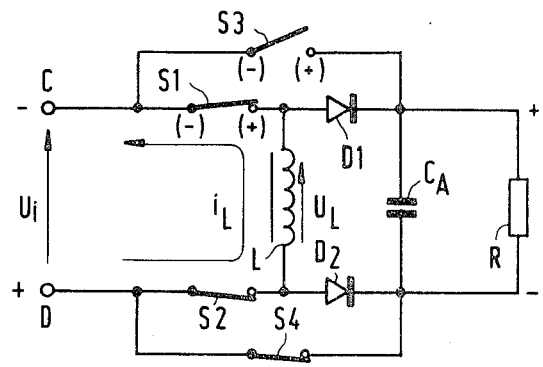
FIGS. 2a–2d show the principle circuit diagram of an electronic transformer comprising two combined fly-back converters
Figure 2B:
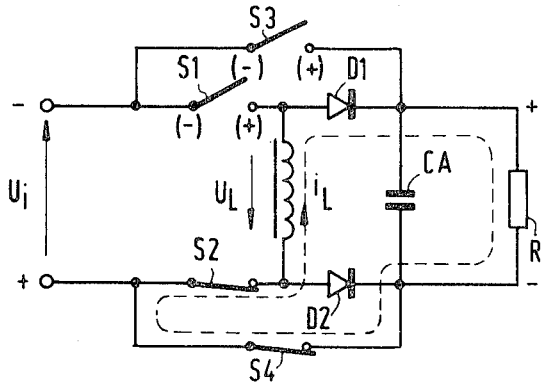

The arrangement shown in FIGS. 2a and 2b show the alternating voltage converter in the negative half period of the input alternating voltage, the switch S3 being opened and the switches S2 and S4 being closed. FIG. 2a represents the conductive phase with closed switch S1 while FIG. 2b represents the cut-off phase with opened switch S1.

Figure 2C:
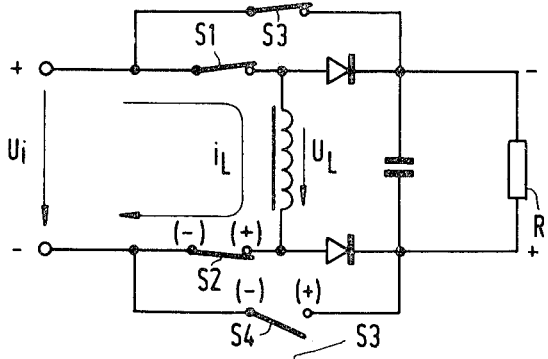
Figure 2D:
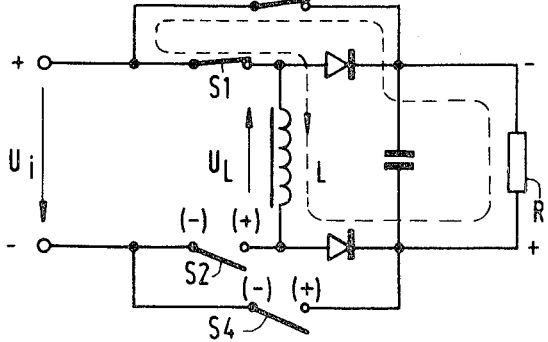

The arrangements shown in FIGS. 2c and 2d show the electronic transformer in the positive half period of the input alternating voltage, the switch S4 being opened and the switches S1 and S3 being closed. FIG. 2c represents the conductive phase with closed switch S2 and FIG. 2d represents the cut-off phase with opened switch S2.

S2 and D2 are the elements for the inverse polarization inserted in mirror-image arrangement. In the negative half period as considered hitherto, S2 and D2 are shunted by an auxiliary switch S4, while in the positive half period a further auxiliary switch S3 short-circuits the original combination of switch and diode (S1/D1). The two auxiliary switches S3,S4 have to satisfy the same voltage requirements as the main switches S1, S2, but can switch considerably slower because they are changed over only at the mains frequency. As in the fly-back converter according to FIG. 1, the choke coil L common to the two fly-back converters can be propertioned so that a continuous operation is adjusted. A fixed alternating voltage transformation dependent upon $V_T$ is then obtained or, when the arrangement is operated discontinuously, a fixed alternating power is transmitted.

FIGS. 2a to 2d show the whole sequence of the switching states of the four switches. During the negative half period (FIGS. 2a, b), S3 is opened and S2 and S4 are closed, and S1 operates in the same manner as the switch S in FIG. 1 and ensures the energy transmission. During the positive half period (FIGS. 2c, d), S4 is opened and S1 and S2 are closed, while S2 transmits the energy in the same manner as in the principle circuit diagram of FIG. 1. Consequently, with a suitable drive of the switches, this arrangement is able to transmit both positively and negatively polarized voltages and, according to what has been stated above about half periods, also sinusoidal alternating current of the mains frequency.

As can been from FIG. 2, the switches S3, S4 need not necessarily shunt the associated switch/diode combinations. It would be sufficient if S3 shunts the diode D1 and S4 shunts the diode D2 because with S4, S2 is also always closed and the S3, S1 is also always closed. However, the polarization of S3 and S4 ((−), (+)) shows that in the case of transistor switches the problem described above wowuld arise, that the negative pole is connected to the choke coil. This in turn leads to problems with respect to the drive if semiconductors for positive operating voltages (npn transistors, n-channel FET's etc.) are used. Therefore, the circuit arrangement shown in FIG. 2 is to be preferred.

Figure 3:
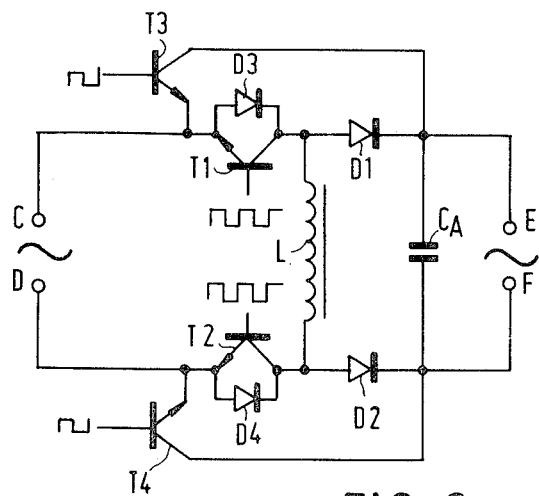
FIG. 3 shows the circuit arrangement of an electronic transformer.

FIG. 3 shows an embodiment of an electronic transformer according to FIG. 2 comprising bipolar transistors T1, T2 as switches S1 and S2, respectively. In the half period in which the collector voltage of one of the switching transistors T1 or T2 beomes negative with respect to its emitter (inactive state of the fly-back converter formed by T1 and T2, respectively), a backward diode D3 and D4, respectively, connected parallel to the collector-emitter path takes over the function of S1 and S2, respectively. Thus, the change-over between the positive and the negative half period does not require a separate drive of the switching transistors and these transistors are protected by the backward diodes from wrong polarization and inverse operation. In case the switching transistors T1 and T2 are constructed as high-voltage field effect transistors, the backward diodes D3 and D4 are already contained therein so that separate backward diodes are not required.

In the electronic transformer of FIG. 3, the switches S3 and S4 of FIG. 2 are auxiliary transistors T3 and T4, which are preferably constructed as high-voltage bipolar trasistors. These auxiliary transistors T3 and T4 are connected by their bases to a more particulary pulsatory alternating voltage source having a frequency corresponding to that of the input alternating voltage and are connected by their emitters to the emitter (which is in connection with a terminal C and D, respectively, of the input alternating voltage source) of the switching transistors T1 and T2, respectively.

In the negative half period of the input alternating voltage, the switching transistor T1, the choke coil L and the fly-wheel diode D1 form the fly-back converter. The auxiliary transistor T4 is switched on and shunts the switching transistor T2 and the fly-wheel diode D2, while the backward diode D4 shortcircuits the switching transistor T2. The auxiliary transistor T3 and the backward diode D3 are cut off. During the positive half period of the input alternating voltage, the switching transistor T2, the choke coil L and the fly-wheel diode D2 form the fly-back converter. The auxiliary transistor T3 and the backward diode D3 are conducting, while the switching transistor T4 and the backward diode D4 are cut off. Each of the two fly-back converters thus formed operates during its half period as a normal direct voltage converter.

The auxiliary transistors T3 and T4 are switched on and switched off in accordance with their function as switches S3 and S4 in FIG. 2 at the mains frequency, it being essentially not important whether the drive is effected by square wave signals, as shown in FIG. 3, or by other current or voltage forms so long as they only cause the auxiliary transistors to be switched on and off.

Figure 4:
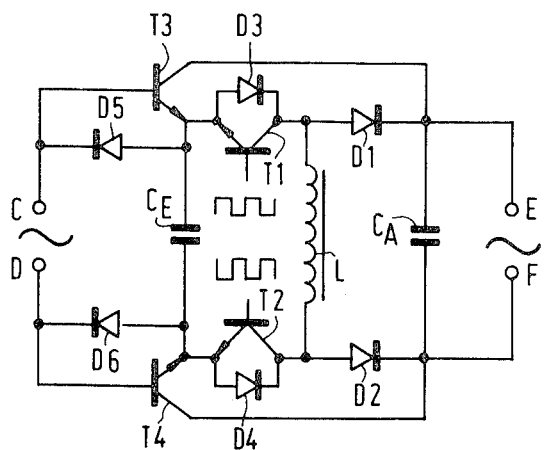
FIG. 4 shows the circuit arrangement of a further electronic transformer.

A particularly simple drive of these auxiliary transistors is shown in FIG. 4. In this electronic transformer, the auxiliary transistors T3 and T4 are connected by their respective bases to a terminal C and D, respectively, of the input alternating voltage source. The emitter-base path of each auxiliary transistor T3 and T4 is shunted by an auxiliary diode D5 and D6, respectively, polarized in a sense opposite to that of the base diode of the relevant auxiliary transistor T3 and T4, respectively. In this case, the change-over of the auxiliary transistors is consequently obtained by means of the input alternating current, which is passed through the base-emitter diodes of the uxiliary transistors, one of the respective auxiliary diodes D5, D6 closing the current path for the cut-off direction of the respective auxiliary transistor T3 or T4.

The input capacitor $C_E$ additionally provided in this electronic transformer facilitates the change-over of the auxiliary transistors at the mains zero passage. Such an input capacitor $C_E$ is in practice in any case required to keep the high-frequency currents produced by the switching operation remote from the mains (suppression of interference). The capacitors $C_E$ and $C_A$ should have a low impedance at the switching frequency (25 to 500 kHz) of the switching transistors T1 and T2 and a high impedance at the output frequency.

At the output E, F of the electronic transformers of FIGS. 3 and 4, an alternating voltage is produced having a frequency corresponding to that of the input alternating voltage and suitable, for example, for operating a gas-discharge lamp or a small motor. In an embodiment as shown in FIG. 4 with a low-pressure mercury vapour discharge lamp of 15 W to 20 W connected to the output terminals E–F, the switching frequency was 100 kHz, the inductance of the choke coil was 500 $\mu$H and the capacitance of the input and output capacitors was 0.1 $\mu$F.

What is claimed is:

1. An electronic transformer comprising first and second flyback switching converters for converting the positive and the negative periods of an input alternating voltage source into a high frequency voltage and subsequently rectifying same to produce an output alternating voltage having a frequency corresponding to that of the input alternating voltage, characterized in that the flyback switching converters each comprise a high-frequency controlled switching transistor coupled to a respective fly-wheel diode, a choke coil coupled to each of the flyback converters, an output capacitor coupled to the first and second flyback converters, an input capacitor coupled to the first and second flyback converters, the choke coil and the output and input capacitors being common to the two flyback converters, first and second backward diodes connected parallel to respective switching transistors of each flyback converter, and wherein each flyback converter includes an auxiliary transistor switching at the input frequency and coupled in shunt with the respective switching transistor and the fly-wheel diode so as to shunt the switching transistor and fly-wheel diode of the other fly-back converter in its inactive state.

2. An electronic transformer as claimed in claim 1 wherein the auxiliary transistors have their respective bases connected to a pulsatory alternating voltage source having a frequency corresponding to that of the input alternating voltage and have their emitters connected to the emitter of the respective switching transistor of a fly-back converter, each said emitter being connected to a respective terminal of the input alternating voltage source.

3. An electronic transformer as claimed in claim 2, characterized in that the auxiliary transistors have their respective bases connected to respective terminals of the input alternating voltage source and in that the emitter-base junction of each auxiliary transistor is shunted by an auxiliary diode polarized in a sense opposite to that of the emitter base junction of the relevant auxiliary transistor.

4. An electronic transformer as claimed in claim 1 wherein the switching transistors comprise high-voltage transistors.

5. An electronic transformer as claimed in claim 4, characterized in that the auxiliary transistors comprise high-voltage bipolar transistors.

6. An electronic transformer as claimed in claim 1 wherein the auxiliary transistors comprise high voltage bipolar transistors.

7. An electronic transformer as claimed in claim 2 wherein the switching transistors comprise high voltage transistors.

8. An electronic transformer as claimed in claim 1 further comprising first and second input terminals for said input voltage and first and second output terminals for said output alternating voltage, and wherein the first flyback converter includes a first said switching transistor and a first said respective fly-wheel diode serially connected between the first input terminal and the first output terminal and the second flyback converter includes a second said switching transistor and a second said respective fly-wheel diode serially connected between the second input terminal and the second output terminal, the choke coil being connected to a first junction point between the first switching transistor and the first flywheel diode and to a second junction point between the second switching transistor and the second fly-wheel diode, the output capacitor being coupled across the output terminals, and wherein a first said auxiliary transistor is connected in shunt with the series connection of the first switching transistor and the first fly-wheel diode and a second said auxiliary transistor is connected in shunt with the series connection of the second switching transistor and the second fly-wheel diode.

9. An electronic transformer comprising first and second flyback switching converters coupled between first and second input terminals for a low frequency AC voltage and first and second output terminals for supplying a transformed AC voltage at said low frequency, the first flyback switching converter including a first switching transistor to be operated at a high frequency in series circuit with a first fly-wheel diode between the first input terminal and the first output terminal, the second flyback switching converter including a second switching transistor to be operated at said high frequency in series circuit with a second fly-wheel diode between the second input terminal and the second output terminal, a coil coupled to each of the flyback converters so as to be operative as a common coil for each flyback converter, an output capacitor coupled to the output terminals so as to operate as a common output capacitor for each flyback converter, a first diode connected anti-parallel to the first switching transistor and a second diode connected anti-parallel to the second switching transistor, a first auxiliary transistor to be switched at the input frequency and connected in shunt with the series circuit of the first switching transistor and the first flywheel diode, and a second auxiliary transistor to be switched at the input frequency and connected to shunt with the series circuit of the second switching transistor and the second fly-wheel diode, said auxiliary transistors being alternately conductive at the input frequency.

10. An electronic transformer as claimed in claim 9 wherein the first fly-wheel diode and the first diode are connected with the same polarity between the respective first input and output terminals and the second fly-wheel diode and the second diode are connected with the same polarity between the respective second input and output terminals.

11. An electronic transformer as claimed in claim 9 wherein the first auxiliary transistor is connected so as to be effectively in anti-parallel with the first switching transistor and the first fly-wheel diode is connected with reverse polarity relative to the first switching transistor, and wherein the second auxiliary transistor is connected so as to be effectively in anti-parallel with the second switching transistor and the second fly-wheel diode is connected with reverse polarity relative to the second switching transistor.

12. An electronic transformer as claimed in claim 9 further comprising means for coupling control electrodes of the first and second auxiliary transistors to respective ones of said input terminals so as to switch the auxiliary transistors at the input frequency and during mutually exclusive half periods of the input AC voltage.

* * * * *

UNITED STATES PATENT AND TRADEMARK OFFICE
CERTIFICATE OF CORRECTION

PATENT NO. : 4,598,349

DATED : July 1, 1986

INVENTOR(S) : Klaus B. Lohn

It is certified that error appears in the above-identified patent and that said Letters Patent is hereby corrected as shown below: Title page:

IN THE ABSTRACT

Line 9    delete "high frequency"

Line 11    change "each" to --respective high frequency--

IN THE CLAIMS

Column 8, line 18, Claim 9, change "to" to --in--

Signed and Sealed this

Tenth Day of January, 1989

Attest:

DONALD J. QUIGG

Attesting Officer   Commissioner of Patents and Trademarks